J. A. & L. VAN RIPER.
MACHINE FOR STRETCHING AND FOLDING MOSQUITO NETTING.
No. 39,868.            Patented Sept. 8, 1863.
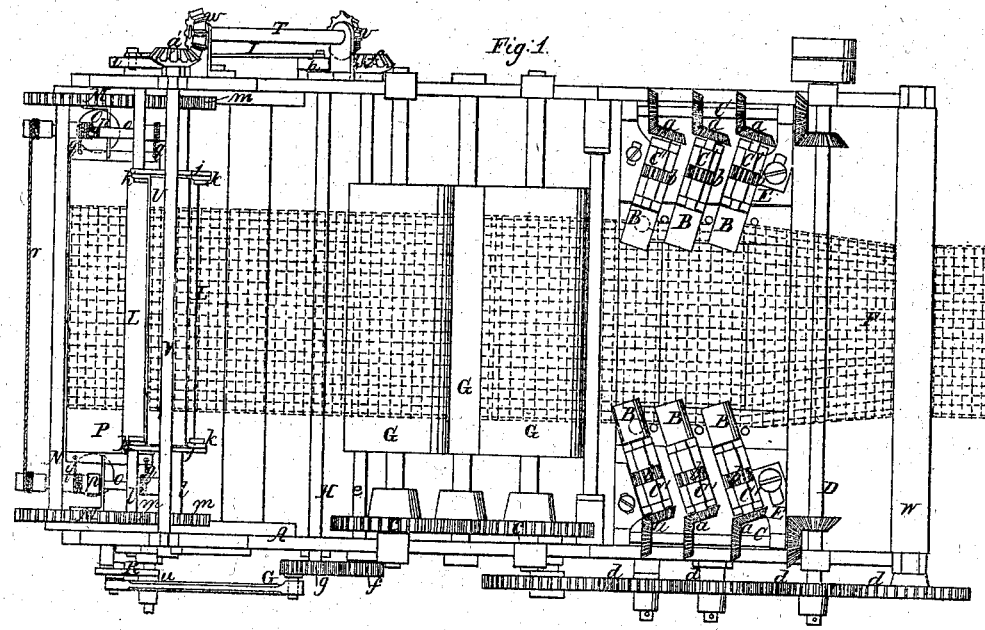
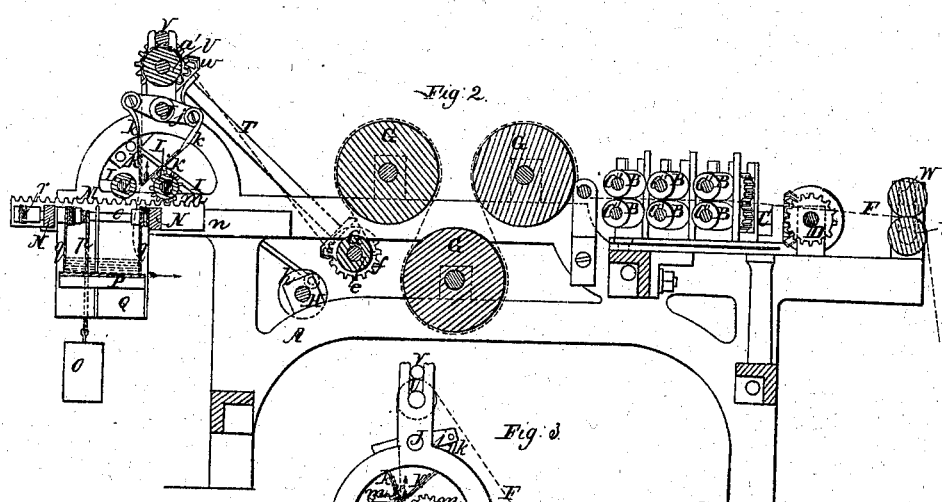
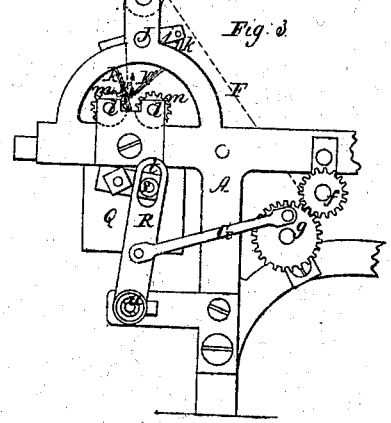

UNITED STATES PATENT OFFICE.

JACOB A. VAN RIPER, OF SPRING VALLEY, NEW YORK, FOR HIMSELF, AND AS ADMINISTRATOR OF THE ESTATE OF LEWIS VAN RIPER, DECEASED.

IMPROVEMENT IN MACHINES FOR STRETCHING AND FOLDING MOSQUITO-NETTING.

Specification forming part of Letters Patent No. 39,868, dated September 8, 1863.

*To all whom it may concern:*

Be it known that JACOB A. VAN RIPER, of Spring Valley, in the county of Rockland and State of New York, and LEWIS VAN RIPER, deceased, who was of the same place, county and State aforesaid, did invent a new and Improved Machine for Stretching and Folding Mosquito-Netting and Similar Fabrics; and be it further known that I, JACOB A. VAN RIPER, aforesaid, as joint inventor, and as administrator for the heirs of LEWIS VAN RIPER, deceased, do hereby declare that the following is a full, clear, and exact description of the same, reference being had to the accompanying drawings, making a part of this specification, in which—

Figure 1 is a plan or top view of the invention; Fig. 2, a side sectional view of the same, taken in the line $x\,x$, Fig. 1; Fig. 3, a side view of a portion of the same.

Similar letters of reference indicate corresponding parts in the several figures.

This invention consists in the employment or use of a series of oblique rollers, arranged in pairs and used in connection with feeders and a reciprocating bed, all arranged as hereinafter shown and described, whereby the work of stretching and folding the netting or other material may be done in an expeditious and perfect manner.

To enable those skilled in the art to fully understand and construct the invention, I will proceed to describe it.

A represents a framing, which may be constructed in any proper manner to support the working parts of the device; and B represents a series of pairs of rollers, which are placed at each side of the framing on its top and in an oblique position, as shown clearly in Fig. 1. The pairs of rollers at each side of the framing A are parallel with each other. These rollers are rotated from shafts C C by means of gears $a$, the shafts C C being rotated from a driving-shaft, D, and the shaft C' of each pairs of rollers being connected by gears $b$. The bearings of the rollers B are attached to plates E, which are adjustable in a transverse direction with the framing, in order that the rollers may be adjusted to suit the width of the fabric F to be stretched.

G represents a series of rollers, which are placed transversely in the framing A, and are connected at one end by gears $c$, and are driven from the shaft D through the medium of gears $d$. (Shown in Fig. 1.) One of the rollers G, the smallest one, has its shaft $e$ provided with gears $f$ at its ends, one of which meshes into a gear, S, on one end of a shaft, H, the opposite end of said shaft having a crank-pulley, $h$, upon it, which is connected by a pitman, I, with an arm, $i$, on a shaft, J. This shaft J has two cross-heads, $j\,j$, upon it, which have each a spring, $k$, attached to each end, and to the lower ends of these springs or feeders plates K are attached, said plates or feeders being between rollers L L, the shafts $l$ of which have pinions $m$ on them, which gear into racks M M, which work on guides $n$ attached one to each side of the framing. The racks M M are connected by two parallel bars, N N, in which two shafts, $o\,o$, are placed transversely, a shaft being near each rack M, as shown in Fig. 1. The shafts $o\,o$ have ropes or straps $p$ passing around them, to the lower ends of which weights O are attached, and a platform, P, is attached to the shafts $o\,o$ by ropes $q$. The two shafts $o\,o$ are connected by a rope, $r$, to insure a uniform movement of the two shafts $o\,o$. The weights O have a tendency to keep the platform elevated. Each rack M has a pendent plate, Q, attached to it, and from one of these plates a pin, $s$, projects horizontally and fits into an oblong slot, $t$, in the upper end of a lever, R, which has its fulcrum at $u$. This lever R is connected by a pitman, G, with the gear $g$ of the shaft H. The gear $f$ at the end of the shaft $e$ of the roller G—the gear not hitherto described—meshes into a wheel, $v$, at the lower end of an inclined shaft, T, the upper end of which has a wheel, $w$, upon it, which gears into a wheel, $a'$, on a roller, U, which is directly over the shaft J.

V is a small roller which rests upon the roller U.

The operation is as follows: The fabric F passes between feed-rollers W W, and the edges of the fabric pass between the oblique rollers B. The fabric then passes around the rollers G and the roller U, and down between the plates K K and upon the platform P, as shown clearly in Fig. 2. The fabric F is stretched transversely by the rollers B and made of a uniform width throughout, and the fabric in passing down upon the platform P is folded, the folds being produced by the reciprocating movement of the platform P and the reciprocating movement of the plates or feeders K K, the latter folding the fabric properly down on the platform. The rollers L L serve as guides for the plates K K and the fabric. The reciprocating movement of the platform P is produced by the lever R, pitman G, and gear $g$ at the end of the shaft H. The rollers L L are rotated in consequence of the pinions $m$ gearing into the racks M M. This folding of the fabric F, of course, measures it, as the folds are of a uniform length. The platform P, in consequence of being suspended, as shown, with weights connected with it, is allowed to descend as the folds of the fabric increase upon it.

Having thus described the invention, what is claimed as new, and for which Letters Patent is desired, is—

1. The reciprocating platform P, in connection with the reciprocating plates or feeders K K and rollers L L, all arranged substantially as and for the purpose set forth.

2. The combination of the oblique rollers B, platform P, plates K, and rollers G, all arranged for joint operation, as and for the purpose specified.

JACOB A. VAN RIPER.
*Administrator of Lewis Van Riper.*

Witnesses:
ROBT. H. LOUDEN,
GEO. W. REED.